United States Patent
Nguyen et al.

(10) Patent No.: US 10,719,066 B2
(45) Date of Patent: Jul. 21, 2020

(54) AUDIO RECOGNITION-BASED INDUSTRIAL AUTOMATION CONTROL

(71) Applicant: Rockwell Automation Technologies, Inc., Mayfield Heights, OH (US)

(72) Inventors: Thong Nguyen, New Berlin, WI (US); Paul David Schmirler, Glendale, WI (US); Alvaro Sanchez, Oak Creek, WI (US); Darrell Steven Filtz, Cedarburg, WI (US); Steven James Litzau, Greendale, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 24 days.

(21) Appl. No.: 16/116,605

(22) Filed: Aug. 29, 2018

(65) Prior Publication Data

US 2020/0073367 A1 Mar. 5, 2020

(51) Int. Cl.
*G05B 19/418* (2006.01)
*G06F 16/632* (2019.01)
*G06F 16/683* (2019.01)

(52) U.S. Cl.
CPC ..... *G05B 19/4183* (2013.01); *G05B 19/4184* (2013.01); *G06F 16/634* (2019.01); *G06F 16/683* (2019.01); *G05B 2219/35458* (2013.01); *G05B 2219/37337* (2013.01)

(58) Field of Classification Search
None
See application file for complete search history.

(56) References Cited

U.S. PATENT DOCUMENTS

| | | | | |
|---|---|---|---|---|
| 9,431,021 | B1* | 8/2016 | Scalise | G10L 21/00 |
| 9,498,885 | B2* | 11/2016 | Scott | B25J 9/1694 |
| 9,805,460 | B2* | 10/2017 | Michalscheck | G06T 7/001 |
| 10,089,072 | B2* | 10/2018 | Piersol | G06F 3/167 |
| 10,152,968 | B1* | 12/2018 | Agrusa | G10L 15/22 |
| 10,274,911 | B2* | 4/2019 | Uppala | G10L 15/22 |
| 2001/0044666 | A1* | 11/2001 | Eastty | G11B 27/031 700/94 |
| 2008/0127065 | A1* | 5/2008 | Bryant | G05B 19/056 717/109 |
| 2014/0156281 | A1* | 6/2014 | Boyd | H04L 12/281 704/275 |

(Continued)

OTHER PUBLICATIONS

Miao, A. et al; Kickstarter, ReSpeaker—Add Voice Control Extension to Anything You Like; https://www.kickstarter.com/projects/seeed/respeaker-an-open-modular-voice-interface-to-hack; launched Aug. 23, 2016, 40 pages.

*Primary Examiner* — Ramesh B Patel
(74) *Attorney, Agent, or Firm* — Fletcher Yoder, P.C.

(57) ABSTRACT

A system for performing industrial automation control may include an audio device that receives audio data from an element in an industrial automation system. The audio device may determine orientation data based on the audio data. In addition, the audio device may determine an automation command to control a machine in the industrial automation system based on the audio data and the orientation data. After determining the automation command, the audio device may implement a first control action for the machine based at least in part on the automation command, where the first control action causes the machine to adjust an operation.

20 Claims, 7 Drawing Sheets

(56) References Cited

U.S. PATENT DOCUMENTS

| | | | |
|---|---|---|---|
| 2014/0244036 A1* | 8/2014 | Scott | G05B 15/02 |
| | | | 700/253 |
| 2015/0242182 A1* | 8/2015 | McAdam | G05B 19/409 |
| | | | 700/83 |
| 2016/0103500 A1* | 4/2016 | Hussey | G06F 3/046 |
| | | | 345/173 |
| 2018/0131907 A1* | 5/2018 | Schmirler | H04N 7/181 |
| 2018/0307201 A1* | 10/2018 | Nguyen | G05B 19/4183 |
| 2019/0147655 A1* | 5/2019 | Galera | G06F 3/011 |
| | | | 345/419 |

* cited by examiner

AUDIO RECOGNITION-BASED INDUSTRIAL AUTOMATION CONTROL

BACKGROUND

The disclosure relates generally to systems and methods for controlling devices within an industrial automation system. More particularly, embodiments of the present disclosure are related to systems and methods for controlling devices in the industrial automation system using audio devices disposed within the industrial automation system to improve robustness, reliability, and accuracy of operations within industrial environment.

Industrial automation systems are managed and operated using automation control and monitoring systems, particularly in industrial automation environments. Such applications may include the powering of a wide range of actuators, such as valves, electric motors, and so forth, and the collection of data via sensors. Typical automation control and monitoring systems may include one or more components, such as programming terminals, automation controllers, input/output (I/O) modules, communication networks, human-machine interface (HMI) terminals, and the like.

Generally, certain precautions are taken to ensure that devices in industrial automation systems are operated as desired. However, some industrial automation systems are limited in controlling its devices using the automation control and monitoring systems described above. Although these automation control and monitoring systems may be used to manage the operations of the devices within the industrial automation system, improved systems and methods for operating devices within an industrial automation system are desirable.

BRIEF DESCRIPTION

In one embodiment, a method for performing industrial automation control in an industrial automation system is described. The method may include detecting, via an audio device, audio data by a user in the industrial automation system. The method may also include determining, via the audio device, orientation data associated with the user based at least in part on the audio data. In addition, the method may also include determining, via the audio device, an automation command to control a machine based at least in part on the audio data and the orientation data and implementing, via the audio device, a first control action for the machine based at least in part on the automation command.

In another embodiment a system for performing industrial automation control is described. The system may include an audio device that receives audio data of an element in an industrial automation system. The audio device may determine an orientation of an element based on the audio data and an automation command for controlling a machine in the industrial automation system based on the audio data, the orientation of the element, automation commands stored in a database, and audio datasets associated with the stored automation commands stored in the database. In addition, the audio device may send a first control action to the machine based at least in part on the automation command. The first control action may cause the machine to adjust an operation.

In yet another embodiment, a tangible, non-transitory computer-readable medium that stores instructions executable by a processor of an electronic device that may cause the processor to detect audio data associated with a first machine or user in an industrial automation system. The processor may also determine orientation data associated with the first machine or user based on the audio data. After determining orientation data, the processor may determine an automation command to control a second machine in the industrial automation system based on the audio data and the orientation data. In addition, the processor may also send a first control action to the second machine based at least in part on the automation command, wherein the first control action causes the second machine to adjust an operation.

DRAWINGS

These and other features, aspects, and advantages of the present disclosure may become better understood when the following detailed description is read with reference to the accompanying drawings in which like characters represent like parts throughout the drawings, wherein.

Figure 1:
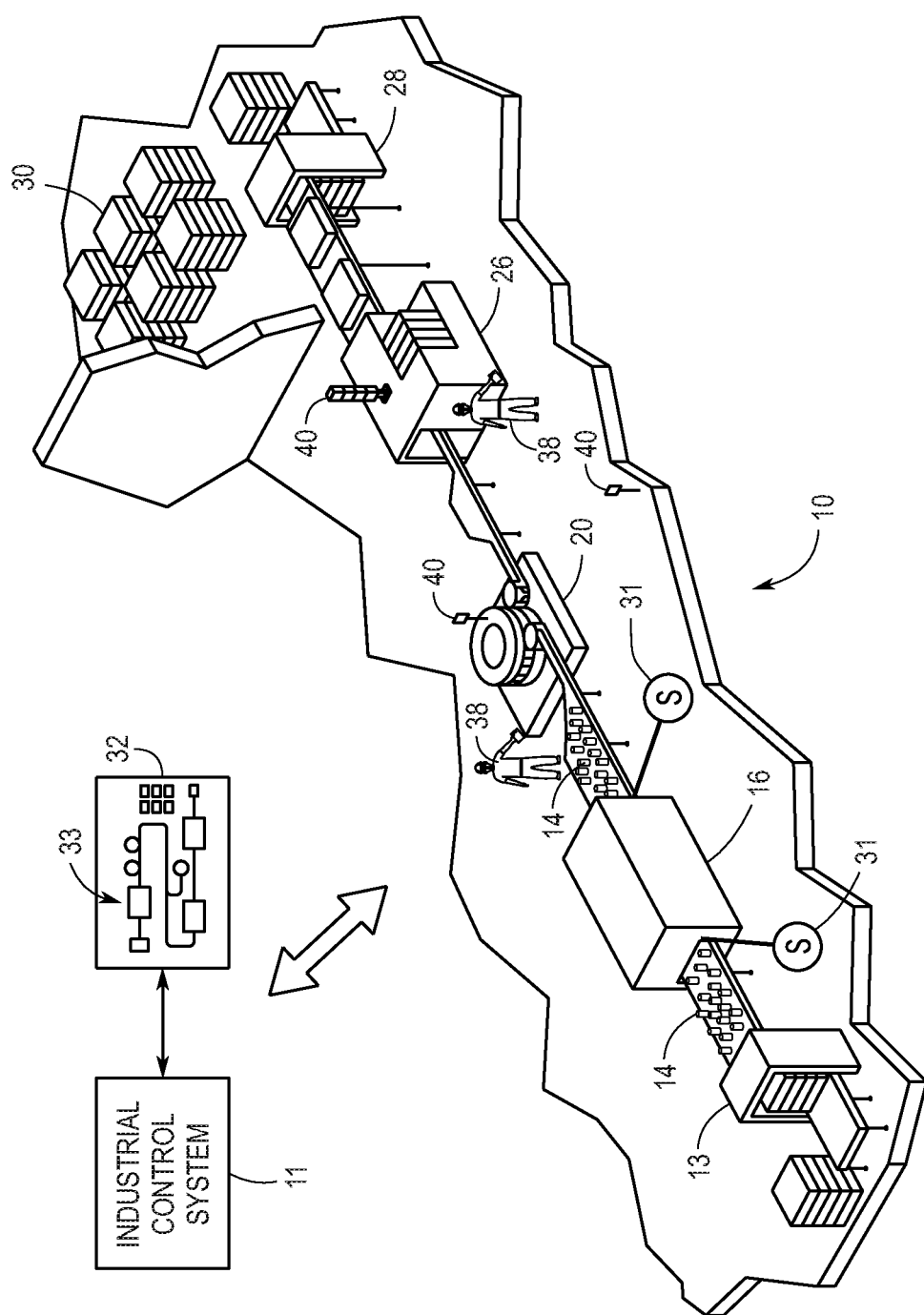
FIG. 1 is a perspective view of an example industrial automation system, in accordance with an embodiment.
Figure 2:
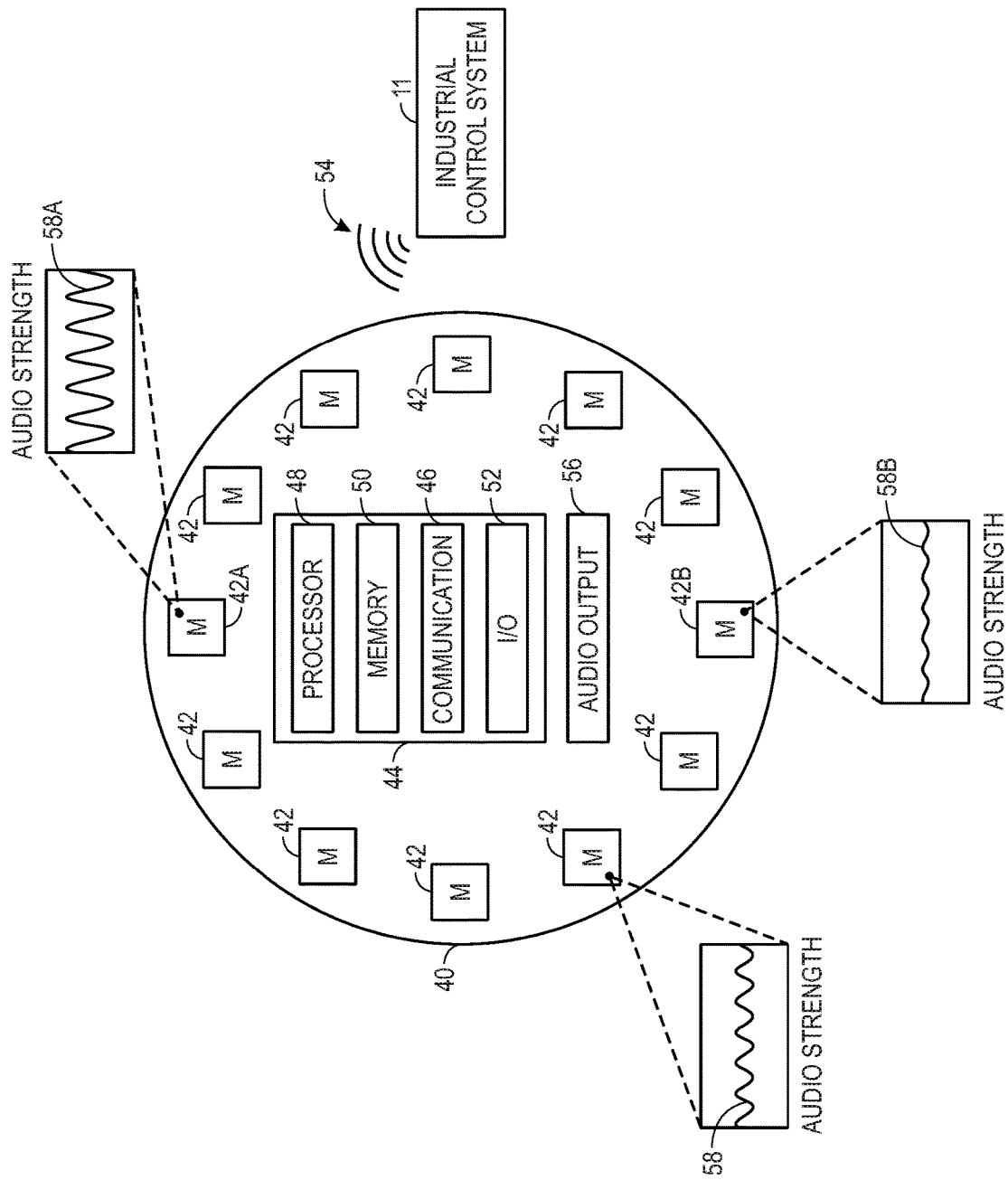
FIG. 2 is a block diagram of an example audio device of the industrial automation system of FIG. 1, in accordance with an embodiment.
Figure 7:
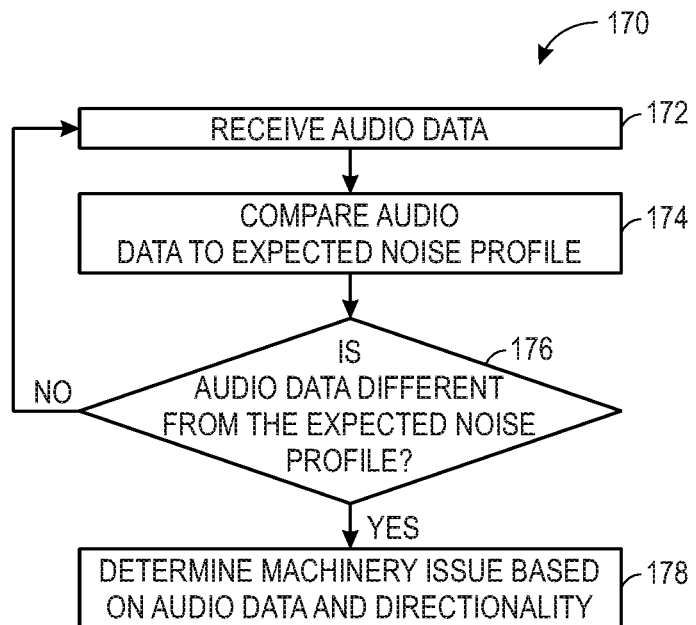
Figure 8:
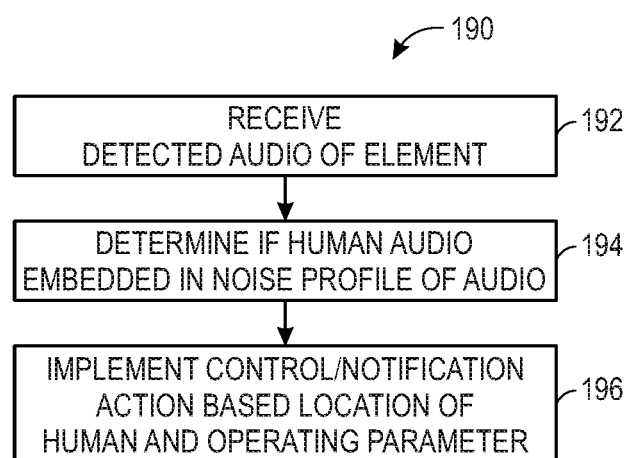

FIG. 7 is a flowchart of a method for monitoring one or more devices within the industrial automation system of FIG. 1 using the audio device of FIG. 2, in accordance with an embodiment; and FIG. 8 is a flowchart of a method for controlling one or more devices within the industrial automation system of FIG. 1 based on whether humans or objects are present as detected by the audio device of FIG. 2, in accordance with an embodiment.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards an audio device disposed in an industrial automation system that may detect sounds or audio spoken or emitted by persons or objects within a space encompassing the industrial automation system. After detecting the audio, the audio device may perform various operations in the industrial automation system based on the detected audio. That is, the audio device may detect audio produced by persons and/or objects (e.g., machines, motors, robots) within the industrial automation system space and use the detected audio to control various industrial automation devices within the industrial automation system. In addition to detecting audio, the audio device, in some embodiments, may detect emotions to determine an urgency of the detected audio and/or a presence of elements in the industrial automation system, as well as orientations of the detected element (e.g., persons and/or objects) in the industrial automation system. The audio device may perform various operations in the industrial automation system based on the detected element and/or the orientation of the detected element.

By using the audio device in the industrial automation system to detect audio of persons and/or objects, an operator may control operations of the industrial automation system while being located physically away from an object that the command is directed towards. For example, a person may be loading boxes onto a conveyor belt, which may transport the boxes to a second machine that wraps the boxes. While the second machine is in the line of sight of the person, the person may verbally request that the second machine stops its operation by directing a command to an audio device disposed on the second machine. In this way, the second machine, which may be inaccessible to the person while he/she is loading the boxes, may be controlled by the person without the person physically interacting with the second machine.

With this in mind, the presently disclosed embodiments include an audio device that may be used in various industrial automation processes including remotely controlling machines associated with the industrial automation system, remotely executing safety procedures to improve workplace safety for personnel, and the like. In one embodiment, a person located within the industrial automation system space may remotely change the behavior of an object or machine of the industrial automation system based at least in part on verbal commands. That is, persons located within the industrial automation system space may direct questions to an audio device that may be associated with a particular component in the industrial automation system to learn more about the component. For example, a person may inquire about information concerning a flow rate of a pipe, a load voltage of a particular motor in the industrial automation system, a purpose or function of a particular object, or any other suitable question. In response to the inquiry, the audio device may interpret the information request, query a database or component to determine an answer for the information request, and audibly respond to the question.

In some embodiments, an industrial environment may be equipped with multiple audio devices that control the operations of multiple components in the environment. To ensure that detected commands are directed to the appropriate audio device, each audio device may include a number of microphones that detect a directionality or orientation of the person providing the audible command. Based on the strength of the audio signal detected by each microphone in one or more audio devices, the directionality of the audible command may be determined, and thus the target audio device may also be identified. The targeted audio device may then perform the audible command.

In some embodiments, the audio device may also operate as an independent unit in the industrial automation system and detect directionality of a command based on an array of microphones and the corresponding strength of signals. Alternatively, each audio device may be designed to detect a limited set of commands that are directed to a component assigned to the respective audio device. In addition, multiple audio devices may operate as a collective unit in the industrial automation system. As a collective unit, the multiple audio devices may each receive audio inputs and, through the collective analysis of the multiple audio inputs and/or through communication with a control system, the control system may output information and/or control operations as requested. For example, the multiple audio devices may use triangulation schemes to determine directionality of a verbal command or the object at which the verbal command is directed towards, to determine a source location of an unexpected sound or where the unexpected sound is emitted from, and the like. Additional details regarding the audio device and various systems and methods for coordinating operations between the audio device and components of the industrial automation system are described in more detail with reference to FIGS. 1-8.

By way of introduction, FIG. 1 is a perspective view of an example industrial automation system 10 controlled by an industrial control system 11. The industrial automation system 10 includes stations having machine components and/or machines to conduct a particular function within an automated process, for example, a beverage packaging process, as is depicted. The automated process may begin at a station 13 used for loading objects, such as empty cans or bottles to be filled, into the industrial automation system 10 via a conveyor section 14. The conveyor section 14 may transport the objects to a station 16 to perform a first action, for example, washing the empty cans and/or bottles. As objects exit from the station 16, the conveyor section 14 may transport the objects to a station 20, such as a filling and sealing station, in a single-file line. A second conveyor section 14 may transport objects from the station 20 to a station 26. After the objects proceed through the various stations, the objects may be removed from the station 28, for example, for storage in a warehouse 30. Clearly, for other applications, the particular system, machine components, machines, stations, and/or conveyors may be different or specially adapted to the application.

For example, the industrial automation system 10 may include machinery to perform various operations in a compressor station, an oil refinery, a batch operation for making food items, a mechanized assembly line, and so forth. Accordingly, the industrial automation system 10 may comprise a variety of operational components, such as electric motors, valves, actuators, temperature elements, pressure sensors, or a myriad of machinery or devices used for manufacturing, processing, material handling, and other applications.

Additionally, the industrial automation system 10 may include various types of equipment that may perform the various operations that may be part of an industrial application. For instance, industrial automation system 10 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation system 10 may also include motors, protection devices, switchgear, compressors, and the like.

In certain embodiments, one or more properties of the industrial automation equipment, such as the station 16, may be monitored and controlled by an industrial control system 11 for regulating control variables. For example, sensing devices (e.g., sensors 31) may monitor various properties of the industrial automation system 10 and may be used in adjusting operations of the industrial automation system 10. In some cases, the industrial automation system 10 may be associated with devices used by other equipment. For instance, scanners, gauges, valves, flow meters, and the like may be disposed on the industrial automation system 10. Here, the industrial control system 11 may receive data from the associated devices and use the data to perform their respective operations more efficiently. For example, a controller of the industrial automation system 10 associated with a motor drive may receive data regarding a temperature of a connected motor and may adjust operations of the motor drive based on the data.

The industrial control system 11 may be communicatively coupled to a display/operator interface 32 (e.g., a HMI) and to devices of the industrial automation system 10. Although one industrial control system 11 is depicted, it should be understood that any suitable number of industrial control systems 11 may be used in a particular industrial automation system 10 embodiment. The industrial control system 11 may facilitate representing components of the industrial automation system 10 through programming objects that may be instantiated and executed to provide simulated functionality similar or identical to the actual components, as well as visualization of the components, or both, on the display/operator interface 32. The programming objects may include code and/or instructions stored in the industrial control system 11 and executed by processing circuitry of the industrial control system 11. The processing circuitry may communicate with memory circuitry to permit the storage of the component visualizations.

As illustrated, the display/operator interface 32 depicts representations 33 of the components of the industrial automation system 10. The industrial control system 11 may use data transmitted by sensors 31 to update visualizations of the components via changing one or more statuses, states, and/or indications of current operations of the components. These sensors 31 may be any device adapted to provide information regarding process conditions. Indeed, the sensors 31 may be used in a process loop that are monitored and controlled by the industrial control system 11. As such, a process loop may be activated based on process inputs (e.g., an input from the sensor 31) or direct input from a person 38 via the display/operator interface 32. The person 38 operating and/or monitoring the industrial automation system 10 may reference the display/operator interface 32 to determine various statuses, state, and/or current operations of the industrial automation system 10 and/or for a particular component. Furthermore, the person operating and/or monitoring the industrial automation system 10 may adjust to various components to start, stop, power-down, power-on, or otherwise adjust an operation of one or more components of the industrial automation system 10 through interactions with control panels or various input devices.

A person 38 controlling or monitoring operation of the industrial automation system 10 may find controlling or monitoring difficult if they walk away or are otherwise located away from the display/operator interface 32 or from a respective control panel. Thus, an audio device 40 may assist the person 38 in remotely monitoring components of the industrial automation system 10 (e.g., while located away from the display/operator interface 32) via verbal or audible commands. The audio device 40 may perform actions in response to verbal or audible commands of the person 38. For instance, the audio device 40 may interpret the audible commands, determine a corresponding command for an associated component, and adjust the operation of the component based on the command. In this way, the person 38 may physically input a change to the operation of a first machine via an interface of the first machine, while using the audio device 40 to change operation of a second machine using verbal or audible commands without physically accessing second machine. For example, the person 38, while at the station 26 may verbally request the audio device 40 to report on or change the operation of the station 28 while physically located away from the display/operator interface 32 or control panel for the station 28. As an additional example, if a person were to fall into a cavity or get locked into a secure space, the person may speak a verbal command or trigger word/phrase to instruct the audio device to enable a light component (e.g., to strobe the light, to blink, to turn to a solid color of light, to change color of light emitted) or some other annunciation output to indicate his/her presence within the area to other nearby personnel. In this way, the presently disclosed embodiments may provide a way to verbally generate and transmit a signal that indicates a presence within the area to other personnel.

Based on a signal strength of the audible command, the audio devices 40 may determine an orientation of the person 38 and a direction of the audible command to facilitate selection of a machine that the audible command is directed towards. In some embodiments, the audio device 40 may detect the audible command projected from a person and confirm that the person has a line of sight with respect to the component being controlled before implementing the associated command. Examples of devices the audio device 40 may control or change operation of include, but are not limited to, actuators, electric motors, electric drives, electric presses, and the like.

To help elaborate, FIG. 2 is a block diagram representation of an audio device 40 including an array of multiple microphones 42. It should be understood that any suitable sound-receiving device may be used in place of, or in addition to, the microphones 42, for example, a combined speaker and microphone device, or a singular microphone 42 may be incorporated into the audio device 40. The audio device 40 may also include processing circuitry 44 including a communication component 46, a processor 48, a memory 50, I/O ports 52, and the like. The communication component 46 may be a wireless or a wired communication component that may facilitate communication between the audio device 40 and other audio devices 40, machines, and/or the industrial control system 11 via a communication network 54. This wired or wireless communication protocols may include any suitable communication protocol include Wi-Fi, mobile telecommunications technology (e.g., 2G, 3G, 4G, LTE), Bluetooth®, near-field communications technology, and the like. The communication component 46 may include a network interface to enable communication via various protocols such as EtherNet/IP®, ControlNet®, DeviceNet®, or any other industrial communication network protocol.

The processor 48 of the audio device 40 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 48 may, in some embodiments, include multiple processors. The memory 50 may include any suitable articles of manufacture that serve as media to store processor-executable code, data, and the like. The memory 50 may store processor-executable code used by the processor 48 to perform the presently disclosed techniques.

Generally, the audio device 40 may receive (e.g., detect) audio data related to the person 38, a machine, and/or any nearby object or the ambient environment via one or more audio sensors (e.g., microphones 42) communicatively coupled to one or more of the I/O ports 52. Upon receiving audio data, the audio device 40, via the processor 48, may interpret the audio data to determine automation commands or actions for the audio device 40 to perform in response to the determined automation command. In some embodiments, that the determined automation command may be forwarded to interpret the detected audio data, the audio device 40 may analyze characteristics of the audio data, including frequency (e.g., pitch), amplitude (e.g., loudness) of the audio data, or any suitable characteristic used to distinguish one verbal command from another verbal command, to determine if the audio data matches the characteristics of an audible automation command stored, learned, or otherwise interpretable by the audio device 40. If a threshold or more characteristics match, the audio device 40 determines an automation command based on the audio data.

In this way, the audio device 40 may be a stand-alone component connected through a direct input/output coupling to the industrial control system 11, components and/or machines of the industrial automation system 10, and the like. The audio device 40 may work with a system of audio devices 40 networked with the industrial control system 11. Each audio device 40 in a networked system may have a unique identifier and certain data disseminated from the audio device 40 may be tagged with the unique identifier. As discussed above, the audio device 40 may be communicatively coupled to the communication network 54, which may include an Internet connection, or otherwise suitable wireless or wired communicative coupling to expand its interpretation and functional capabilities, but, in some embodiments, the audio device 40 may not rely on such a communicative coupling. In other words, the audio device 40 may have particular capabilities that may function without an Internet, wireless, or wired connection. For example, the audio device 40 may perform local command interpretation without an Internet or wireless connection.

In addition, the audio device 40 may use detected audio strength data (e.g., as visualized in graph 58) corresponding to a directionality of the audio data from the person 38 to facilitate determining a context to an automation command (e.g., which machine or component the command is directed towards). For example, the audio device 40 may determine which microphones 42 are receiving the strongest audio data, and in this way the audio device 40 may determine a directionality of the audible command. For example, as shown if FIG. 2, microphone 42A has a larger detected audio strength (e.g., depicted in graph 58A) than the microphone 42B with the detected audio strength data (e.g., depicted in graph 58B). Also, the audio device 40 may use secondary input data from the sensors 31, the industrial control system 11, or the like to increase confidence in a determined automation command from the audio data, verify a determined automation command, determine whether the automation command should be implemented, or the like. When noise is present in one area, the processor may use another microphone in another direction to confirm command. This data may be transmitted to the audio device 40 via I/O ports 52 or the communication network 54. In a similar manner as described above, the audio device 40 may attempt to locally interpret the directionality and/or secondary input data. If the audio device is unable to interpret the directionality and/or secondary input data, the audio device 40 may transmit the directionality and/or secondary input data to a central processing unit of the industrial control system 11 for further interpretation via communication network 54.

The audio device 40 may also include an audio output 56. The audio output 56 may be any suitable audio-transmitting component, such as a speaker. Various status updates and/or error messages may be transmitted from the audio output 56. In addition, an operator may interact with the audio device 40 based at least in part on the audio transmitted from the audio output 56. In this way, the audio output 56 may facilitate communication between an operator and the audio device 40. Furthermore, the operator may leverage the audio output 56 in his/her automation commands. For example, a person 38 may audibly command the audio device 40 to sound an alarm, and in response to determining the associated automation command, the audio device 40 may use a control action to operate itself to emit an alarm sound via the audio output 56.

In some embodiments, the audio device 40 may use the audio data detected from the array of microphones 42 to perform beamforming or spatial filtering techniques direct audio output to a particular direction. That is, in some embodiments, the audio device 40 may include a number of audio outputs 56 (e.g., speakers) disposed around the audio device 40. When responding to an information request or indicating that a command is being implemented, the audio device 40 may use beamforming techniques to direct the audio in the direction of the source of the original audible command. In this way, the audio device 40 may facilitate a more natural conversational experience with the user.

Figure 3:
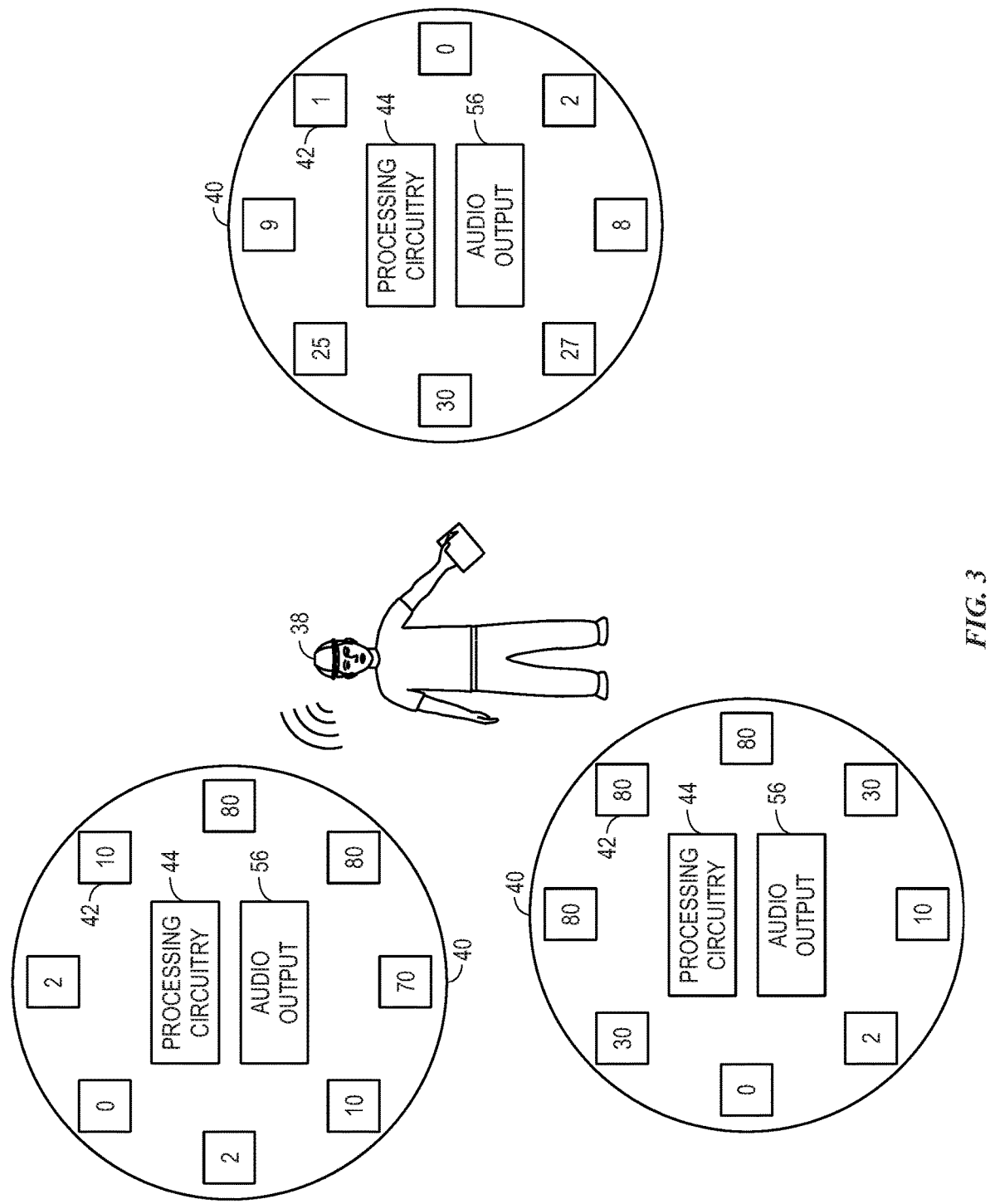
FIG. 3 is a block diagram of multiple audio devices of FIG. 2, in accordance with an embodiment.

FIG. 3 is a block diagram of three audio devices 40 including indications of audio strengths (e.g., 80 dB, 30 dB, 2 dB, and so forth) as detected by various microphones 42 associated with three audio devices 40. As described above, the microphones 42 detect ambient audio data and determine automation commands based on the detected audio data. If the audio device 40 determines the detected audio corresponds to a command, the audio device 40 may reference one or more indications of audio strength to determine a direction of the audio data, or a directionality to the command. Based on this directionality, the audio device 40 may assign a subject (e.g., target machine) to the automation command. In this way, the audio device determines what component to perform the action of the automation command partly based on the directionality associated with the detected audio data. As depicted, the person 38 speaks a command and the three audio devices 40 detect the audio data of the command. In addition, as depicted, the audio devices 40 may use a relative strength of the received audio (e.g., the received audio data is stronger or louder to a first subset of microphones 42 as compared to a second subset of microphones 42) to determine the directionality of the command manifested as orientation data. From the directionality determination, the audio device 40 may determine a target of the verbal command from the person 38, and may use the orientation data to determine which machine to perform the detected automation command. In addition, the audio devices 40 may also determine a source location of the verbal command based on the orientation command of the verbal command and/or based on triangulation schemes in embodiments with three or more audio devices 40 are used in an industrial setting. It should be understood that although the audio devices 40 are shown in multiples, the audio device 40 may operate as a stand-alone device with one microphone 42, a stand-alone device with multiple microphones 42, with other audio devices 40 each having one microphone 42, with other audio devices 40 each having one or more microphones 42, or in any combination of audio devices 40 with any combination of microphones 42.

Figure 4:
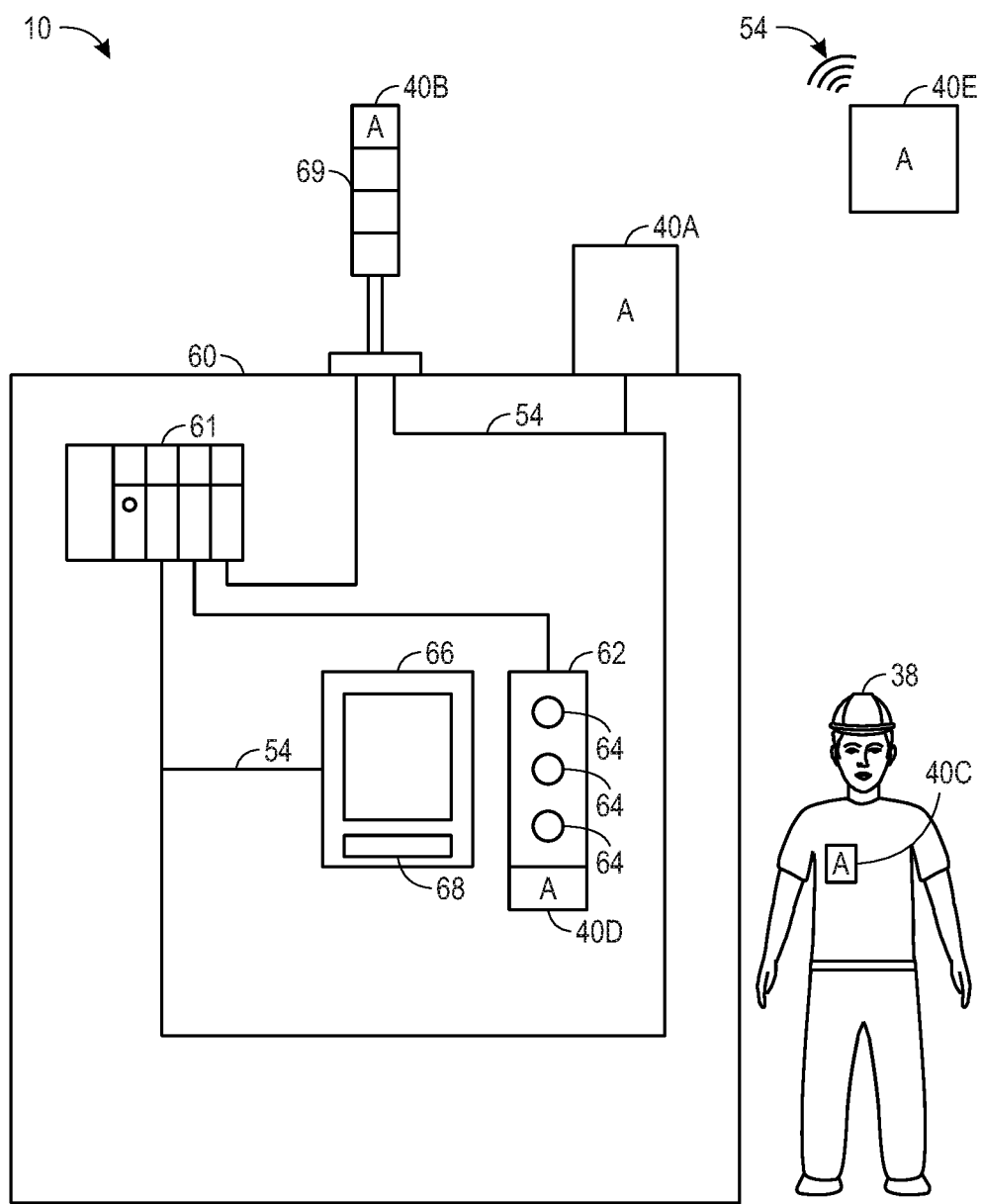
FIG. 4 is a machine and multiple audio devices of the industrial automation system of FIG. 1, in accordance with an embodiment.

After determining the automation command from the detected audio data, the audio device 40 may transmit one or more control signals through the communication network 54 to perform, or facilitate performing, the requested automation command. To help illustrate, FIG. 4 is a block diagram of the industrial automation system 10 including a machine 60 and one or more audio devices 40. The industrial automation system 10 may include the machine 60 as a stand-alone object, an object included in the stations 13, 16, 20, 26, 28 to perform a task of the stations 13, 16, 20, 26, 28, or included as any suitable component of the industrial automation system 10. The machine 60 may include any suitable number of mechanical, electromechanical, pneumatic, or hydraulic devices or operating mechanisms to perform some industrial operation. In addition to the operating mechanisms, each machine 60 of the industrial automation system 10 may include a machine control system 61 responsible at least in part on communicating control operations and/or commands to the industrial control system 11, which may control monitoring of machines or components of the industrial automation system 10. This communication may occur via a communication network 54, or the like. For example, the machine control system 61, via the communication network 54, may receive control signals or commands from the industrial control system 11, may transmit statuses indicative of an operation of the machine 60 to the industrial control system 11, may transmit different inputs from components of the machine 60 to the industrial control system 11, and the like.

Each machine 60 may include one or more interfaces 62 including one or more input devices 64, such as pushbuttons. Each machine may also include a human machine interface (HMI) 66 communicatively coupled to the communication network to facilitate communication between persons operating, monitoring, or controlling the machine 60, the machine control system 61, and/or the industrial control system 11. The HMI 66 may also include one or more input devices 64, such as a keyboard 68, which may enable the person 38 to provide an electrical input into the HMI 66.

In some embodiments, the machine 60 may include one or more stacklights 69 designed to emit light in response to control signals transmitted from the machine control system 61. In this way, the machine control system 61 may transmit a first control signal to operate the stacklight 69 to emit a first color of light and may transmit a second control signal to operate the stacklight 69 to emit a second color of light and/or to stop emission of the first color of light. For example, the stacklight 69 may response to a control signal by strobing, blinking, emitting a solid color of light, changing a color of light emitted, emitting multiple colors of light, changing a color of light emitted, or any combination thereof. The machine control system 61 may operate the stacklight 69 to visually communicate with a person 38 in viewing-range of the stacklight 69, for example, by emitting a first color of light may correspond to a first message, and a second color of light may correspond to a second message. The stacklight 69 may communicate warnings or statuses related to the stacklight 69, the machine 60, the machine control system 61, the industrial control system 11, and the like. The machine 60 may change an operation of one or more stacklights 69 as an automation command determined via one or more audio devices 40. For example, detected audio data may indicate, "Level 1, green strobe, bright," with optionally appended information on the number of stacklights 69 to configure (e.g., one, two, three, ten, or the like, number of stacklights 69), and thus may be used to control operation of one or more stacklights 69. In response to receiving the automation command determined by the audio device 40, one or more of the stacklights 69 may confirm the automation command in a variety of manners. For example, the one or more stacklights 69 may confirm receipt by emitting audio data and/or through strobing a green light at a "Level 1" (e.g., a configurable level of emitted light) for a predetermined duration of time (e.g., thirty seconds, forty-five seconds, a minute, or the like) corresponding to a receipt confirmation.

The machine 60 may include one or more audio devices 40 within a listening range of the machine. Some machines 60 may have one or more audio devices 40 while some may have no audio devices 40, based on specific arrangements of the industrial automation system 10. The audio device 40 may take the form of various embodiments, for example, a stand-alone audio device 40A mounted on various locations on the machine 60, an audio device 40B associated with the stacklight 69, a portable audio device 40C associated with the person 38 (e.g., a wearable audio device 40C), an audio device 40D associated with the interfaces 62, a stand-alone audio device 40E located in proximity to the machine 60 but not directly attached to the machine 60, and the like.

Although the person 38 may operate the machine 60 via the input devices 64, such as pushbuttons, keyboards, touch screen inputs, switches, and the like, the person 38 may also operate the machine 60 via verbal or audible command to the audio devices 40, as described above. Upon receiving the verbal command, each audio device 40 may interpret the verbal command, either locally or via communication to the machine control system 61 through the communication network, to determine an action to perform in response to the verbal or audible command. For example, the person 38 may instruct the machine 60 to stop by pressing the pushbutton or by speaking a verbal or audible command to the audio device 40 that requests the stop. In some embodiments, an operator may be expected to speak an automation command in addition to actuating a push button for additional verification of the automation command. This may help to improve robustness, reliability, and accuracy of using the audio device 40 to operate various machines 60. In response to receiving the verbal or audible command, the audio device 40 may transmit a control signal to the machine control system 61 to cause the machine 60 to stop.

As another example, a person 38 may operate a stacklight 69 using audible commands directed at the audio device 40. The person 38 may speak a command, such as "Light One Red, Strobe," and the audio device 40, in response to determining the corresponding automation command, may respond by operating the stacklight 69 to strobe a red colored light. Other commands may include "Light One Yellow, Blink," "Light Three Green, Steady," or the like. In this way, different operational states of the stacklight 69 may be programmed (or any other suitable machine), including a normal operation state and an abnormal operation state (e.g., strobing red light for abnormal operation and steady green light for normal operation). It is noted that although light characteristics are described above, any controllable output characteristic of the stacklight 69, or other suitable machine, may be controlled, programmed, or adjusted via audible command of the person 38. For example, sound output parameters, such as intensity, volume, or tone emitted from the stacklight 69 may be changed via audible command directed at the audio device 40. Furthermore, in some embodiments, a change made to one stacklight 69 may be applied to multiple stacklights 69 (e.g., a command to a first stacklight 69 to change a first light color to red causes a command to be sent to a second stacklight 69 to change a second light color to red).

Figure 5:
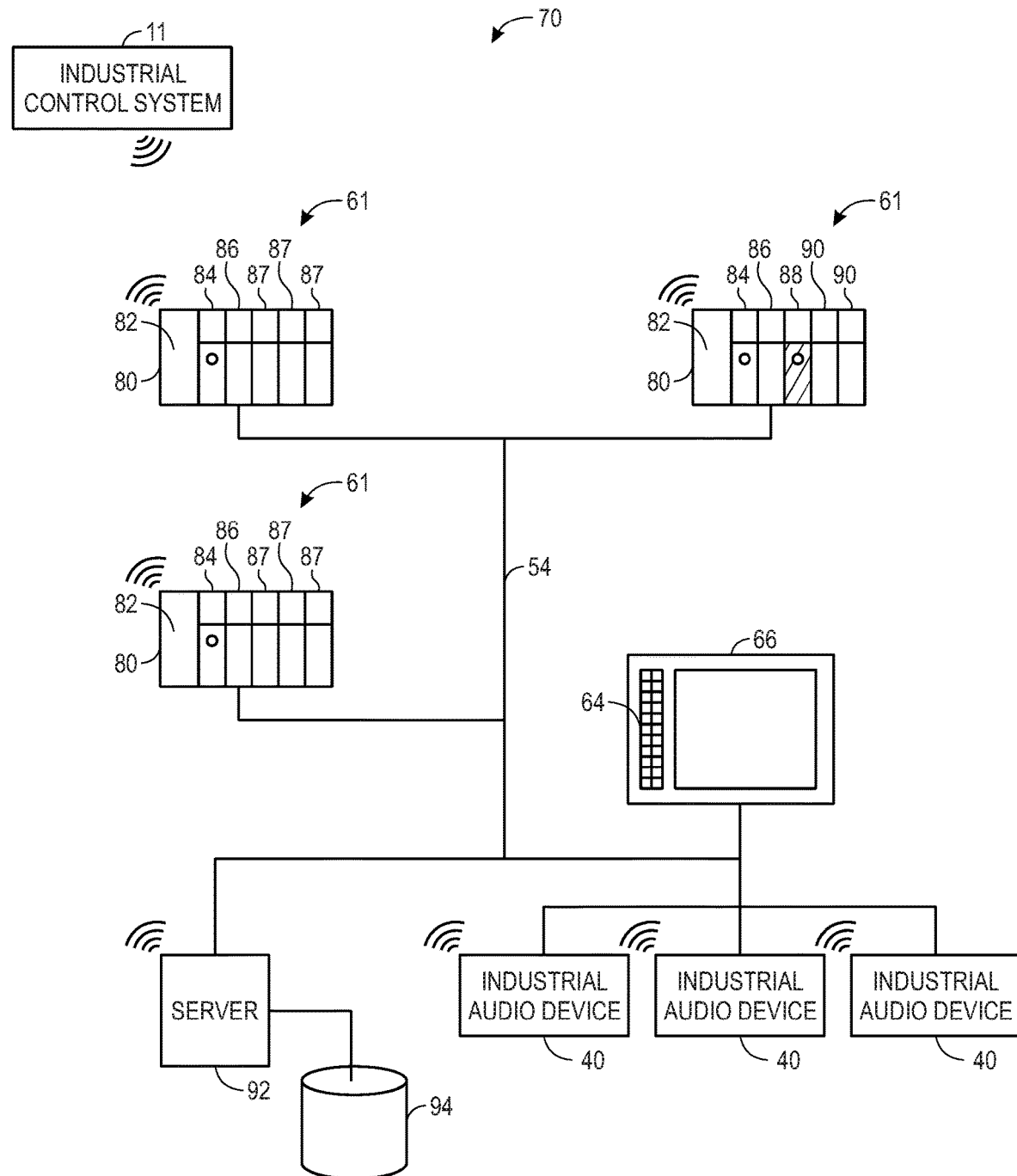
FIG. 5 is a block diagram of a control system that operates the industrial automation system of FIG. 1, in accordance with an embodiment.

To help explain the cooperation between the audio devices 40, the machine control systems 61, and the industrial control system 11, FIG. 5 is a block diagram of the example communication network 54 that may facilitate operation of the industrial automation system 10. The communication network 54 may include multiple machine control systems 61 where at least one machine control system 61 is associated with each machine 60 of the industrial automation system 10. Each machine control system 61 may include a chassis 80, a power supply 82, a programmable logic controller (PLC) 84, an industrial system network interface device 86 communicatively coupled to the communication network 54, and/or various types of input/output (I/O) modules 87. Additionally, some embodiments may include an industrial safety controller 88 and associated safety I/O devices 90.

Each machine control system 61, HMI 66, and audio device 40 may be communicatively coupled to the industrial control system 11 via a wired or wireless connection. In addition, one or more industrial servers 92 may be communicatively coupled to the industrial control system 11 to facilitate authentication of persons 38 operating machines 60 of the industrial automation system 10 in addition to providing control and/or datalogging services to a database 94.

During operation, the industrial control system 11 and/or the machine control system 61 may receive inputs from a variety of devices, such as input devices 64, sensors 31, audio devices 40, and the like. These inputs may be status updates, commands, audio data, or control signals from the variety of devices. Based at least in part on the received inputs, the industrial control system 11 and/or the machine control system 61 may operate to perform an action, such as changing an operation of a machine 60, updating an indication on the display/operator interface 32, transmitting a control signal to initiate operation of a stacklight 69, communicating with the server 92 to store indication of the input into the database 94, and the like. In addition, the person 38 may use the inputs to control or monitor operating conditions or operation of the industrial automation system 10. In response to the operating conditions or operation of the industrial automation system 10, the person 38 may speak an audible command to one or more of the audio devices 40 to cause the execution of an automation command to facilitate in controlling or monitoring components or operations of the industrial automation system 10.

Figure 6:
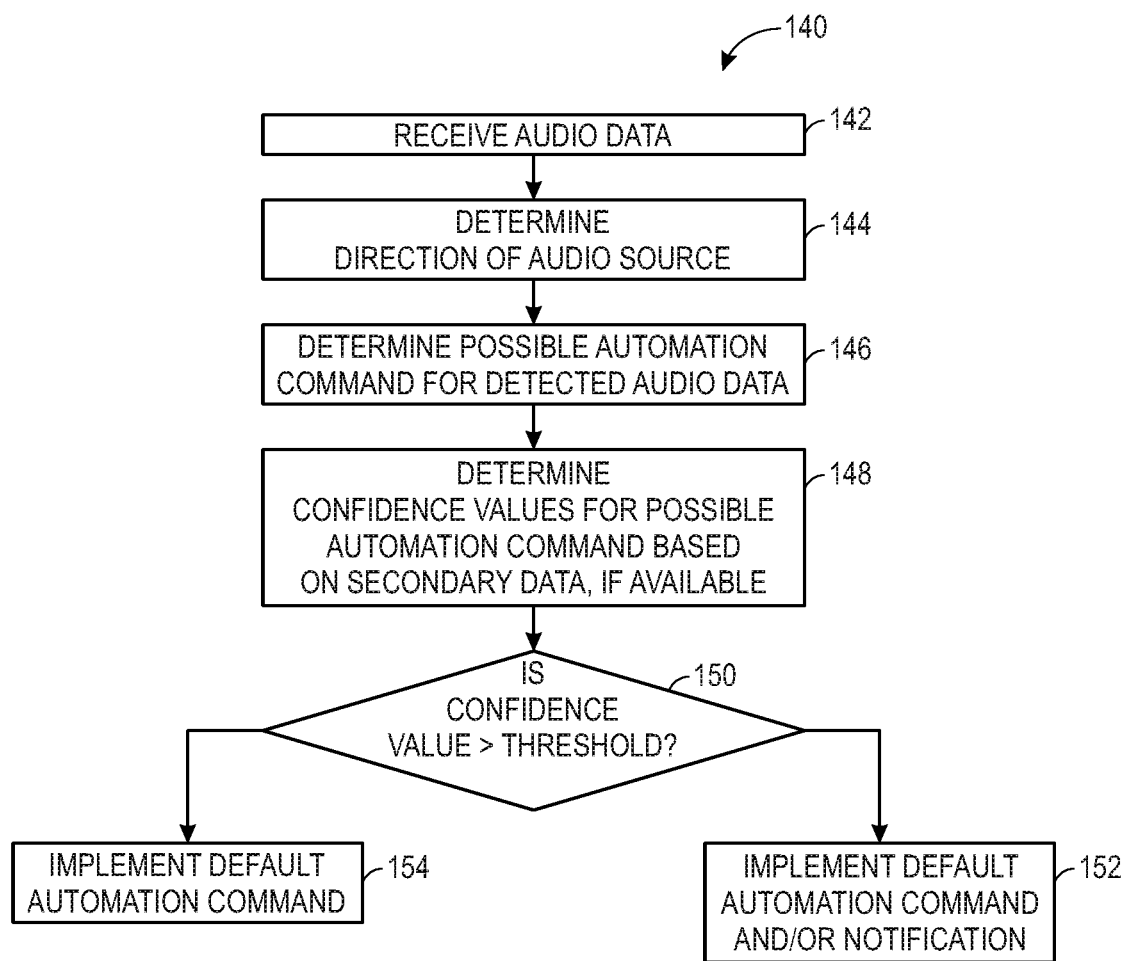
FIG. 6 is a flowchart of a method for controlling one or more devices within the industrial automation system of FIG. 1 using the audio device of FIG. 2, in accordance with an embodiment.

Keeping the forgoing in mind, FIG. 6 is a flowchart of a method 140 for implementing automation commands within the industrial automation system 10. Although the method 140 is described below as performed by the audio device 40, it should be noted that the method 140 may be performed by any suitable processor to perform automation commands based on detected audio data. Moreover, although the following description of the method 140 is described in a particular order, it should be noted that the method 140 may be performed in any suitable order.

At block 142, the audio device 40 may receive audio data corresponding to a verbal command from a person 38 from one or more microphones 42. The processor 48 may store the audio data (e.g., digitized data from analog input) in the memory 50. In addition, the audio device 40 may filter, pre-process, or prepare the received audio data prior to interpretation to improve interpretability of the received audio data. In other words, the audio device 40 may reduce noise components of the received audio data. The audio device 40 may filter received audio data, for example, by using fast Fourier transform (FFT) filtering techniques to separate the received audio data into its frequency components and discard the frequency components corresponding to background noise of the industrial automation system 10, however, the audio device 40 may use a variety of noise filtering techniques to improve interpretability of the received audio data. For example, the audio device 40 may use the FFT filtering techniques, learning algorithms to learn normal or expected operational noises of the industrial automation system 10 (and thus may ignore the audio data that is expected), neural net filtering techniques, and the like.

In some embodiments, the audio device 40 may receive certain automation commands without using a trigger or prompting word (e.g., "hey audio device") that prompts the audio device 40 to use audio data received after the trigger word to determine to the automation command. Instead, the audio device 40 may use repetition of commands (e.g., recited word or phrase) in place of the trigger word and a directionality of the verbal command is sufficient to cause the audio device 40 to control the machine 60 (assuming the operator is orientated toward the machine 60). For example, the audible command may be stated as, "stop stop stop," in a direction towards a certain machine. In this way, the first "stop" may be used to initialize the audio device 40, the second "stop" may be used to validate or confirm that the command used to initialize the audio device is indeed the command that the person 36 intends to perform, and the third "stop" may be used to initiate the implementation of the command. In this way, the third "stop" acts as a trigger or indication to cause the audio device 40 to implement the detected automation command. A particular benefit from using the command without trigger words is that less memory is used to store the commands because the trigger words do not have to be stored (e.g., two words are stored for repetition commanding versus the five words stored for trigger word commanding). Another benefit is that the redundant command (e.g., "stop stop stop") may reduce a likelihood that causal conversation is accidentally detected by the audio device 40 and used to enact an automation command. In addition, a confidence level in the detected automation command may improve since the audio device 40 uses repeated instances of the audio data to interpret the automation commands.

At block 144, the audio device 40 may determine a direction of the audio source. The audio device 40 may determine a location, orientation, or direction of the audio source to facilitate determining the automation command. In some embodiments, the audio device 40 may communicate with one or more additional audio devices 40 to determine directionality of the audio data based at least in part on relative signal strengths of the received audio data. After the audio device 40 determines the direction of the audio data (e.g., where the audio source is located relative to the receiving audio device 40), the audio device 40 may convert the directionality into data or information indicative of the location of the audio source in the industrial automation system 10 (e.g., relative to nearby machines or a direction and/or component the person 38 aimed, or was speaking in, while verbally commanding the audio device), a direction in which the audio data is directed towards, and the like.

At block 146, the audio device 40 may determine a possible automation command for the detected audio data. The audio device 40 may determine the possible automation command if the detected audio data passes an authentication process or analysis to verify an operator speaking the command. This authentication process may facilitate to increase reliability and accuracy of commanding the audio device 40 to operate machines 60. In one embodiment, the audio device 40 may determine the possible automation command through the processor 48 comparing the detected audio data to a library of audio automation commands, where each audio automation command in the library corresponds to one or more characteristics used to match the detected audio data to the possible automation commands. The library of audio automation commands may be stored in the memory 50 of the audio device 40 or other suitable storage device. The audio device 40 may select the automation command that best matches the characteristics (e.g., sound wave amplitude) of the detected audio data as the possible automation command.

At block 148, the audio device 40 may determine confidence values for the possible automation command determined at block 146 based on secondary input (e.g., secondary data received as an input), if available. As mentioned above, the audio device 40 via the processor 48 may determine the confidence value based on a variety of secondary inputs including historical data, expected positions, directions, or orientations of the person 38, inputs from instrumentation, repetition of commands, and the like. Generally, the secondary input may include any input or signal received or generated by the machine control system 61, the industrial control system 11, or the audio device 40 that may be used to supplement or confirm the automation command. These secondary inputs provide data related to a presence of a user in the industrial automation system 10 to the audio device 40 to enhance automation command, and subsequent control action, determination. As such, the audio device 40 may verify the validity of the interpreted automation command based on whether an expected secondary input has been received by the machine control system 61, the industrial control system 11, or the audio device 40. In addition, the audio device 40 may receive a secondary input indicative of a measurement and may change an adjustment to be performed via the automation command based on the secondary input. The secondary input may be any suitable input to help to protect against the audio device 40 misinterpreting detected audio data or to help enhance performing of an automation command. In addition, the secondary input may be part of a redundant operation scheme (e.g., n-factor authentication scheme). For example, an operator may be expected to speak an automation command in addition to actuating a push button for additional verification of the automation command. In some embodiments, this n-factor authentication scheme may be performed by more than one operator to increase redundancy and reliability of the automation command. The n-factor authentication scheme may use any number of secondary inputs to verify the audio data of the automation command.

For example, the secondary input may include an input from an input device 64, operated by the person 38, such as a manual switch or button. The secondary input may also include a weight detected on a safety/pressure mat, a signal from a light curtain indicating whether the light curtain has been broken or interrupted, an indication from an area scanner, or inputs from enable pendants, safety gates, guard interlocks, emergency stop switches, one or more digital cameras, video cameras, infrared sensors, optical sensors, radio frequency energy detectors, sound sensors, vibration sensors, magnetic sensors, heat sensors, pressure sensors, sonar sensors, range imaging technology, and the like. In one embodiment, the secondary input may contribute to determining the location and/or orientation of the person 38. For example, if the audio device 40 determines that the audible command of the person 38 corresponds to an automation command that engages a press machine, the audio device 40 may determine whether the detected location of the person 38 is a safe distance away from the press machine or outside of an area in which a material may be pressed based on the secondary input (e.g., pressure mat, image data) before performing the automation command. As a second example, a person may verbally request information on a machine 60 (e.g., "what is the power output of this motor?") and, based on the secondary input (e.g., pressure pad indicating where the person 38 is standing, inputs from other audio devices 40 for triangulation), the audio device 40 may change the possible automation command from being an automation command directed at the machine 60 to being a second automation command directed at a second machine 60.

In certain embodiments, the audio device 40 may then determine, at block 150, whether the confidence value determined at block 148 is greater than some threshold. If the confidence value determined at block 148 is greater than the threshold, the audio device 40 may proceed to block 152 and implement the automation command determined at block 146. In addition to or in lieu of implementing the automation command, the audio device 40 may send a notification to an administrator or an operator of the industrial automation system 10 indicating that the automation command is being implemented.

For example, if the audio device 40 interprets a verbal command from the person 38 to correspond to an automation command for changing operation of a machine 60 but the specific machine 60 is not recited in the verbal command, the audio device 40 may, at block 152, implement the automation command to the particular machine 60 within the closest proximity to the person 38 or the particular machine 60 that the person 38 is orientated toward, as detected by the audio device 40. In some embodiments, the audio device 40 may determine the orientation of the person 38 based on triangulation schemes of multiple audio devices 40, signal strength of detected audio data, combination of audio data, and the like.

Referring back to block 150, if the confidence value determined at block 148 is less than the threshold, the audio device 40 may proceed to block 154 and implement a default automation command. The default automation command may be a safe state (e.g., power-off, slow down, change operation) command for a respective machine control system 61 or respective machine 60. In one embodiment, the default automation command may include continuing the operation of the respective machine control system 61 without adjusting any operations of the industrial automation system 10. In another embodiment, at block 154, the audio device 40 may send a notification requesting a manual confirmation of the automation command determined at block 146 or a notification indicating that the confidence level is low for the respective automation command. By determining whether to implement the recognized automation command based on the confidence value, the audio device 40 may be safeguarded or protected against interpreting random audio data as an automation command.

In addition to determining automation commands based on detected audio data and, in some embodiments, secondary inputs, the audio device 40 may also analyze ambient audio data to determine if a machine 60 functioning as expected. That is, the audio device 40 may detect abnormal or unexpected audio data and may determine a machinery issue and/or recommend an action for an operator or administrator to perform to correct the machinery issue based on the detected abnormal or unexpected audio data. Additional detail with regard to using audio data to determine machinery issues is provided below with reference to FIG. 7.

Referring now to FIG. 7, FIG. 7 is a flowchart of a method 170 for monitoring a machine 60 of the industrial automation system 10 and performing automatic machine diagnostics based on detected audio data by the audio sensor 56. Although the method 170 is described below as performed by the audio device 40, it should be noted that the method 170 may be performed by any suitable processor to perform automation commands based on detected audio data. Moreover, although the following description of the method 170 is described in a particular order, it should be noted that the method 170 may be performed in any suitable order.

At block 172, the audio device 40 may receive detected audio data of the machine 60 or a collection of machines 60 within a proximity of the audio device 40. Although the detected audio data originates from the machine 60, the audio device 40 receives the detected audio data in a similar manner as described above with reference to block 142 of FIG. 6. This detected audio data may include ambient noise representative of the operation of the industrial automation system.

Upon receiving the detected audio data at block 172, the audio device 40 may compare the detected audio data to an expected noise profile at block 174. The expected noise profile may reflect noises corresponding to normal or expected operating conditions of the machine 60 and/or the space surrounding the machine 60 (e.g., ambient industrial audio). The expected noise profile may include actual audio data of the normal operation, or may include data associated with characteristics of the actual audio data, for example, frequency, amplitude, intensity, or other analysis of the actual audio data. In addition, the noise profile may include a pattern of sound waves, vibration patterns, and the like. The audio device 40 may compare the detected audio data to the expected noise profile based on the expected noise profile characteristics. For example, the audio device 40 may compare detected audio data to the expected noise profile based at least in part on frequency characteristics. In addition, there may be a directionality associated with a given expected noise profile. In this way, the comparison between the detected audio data and the expected noise profile may include comparing an expected directionality of the audio data to a determined directionality of the audio data. This may facilitate identification of when a person 38 is not in a suitable location, or orientation for instructing the audio device 40 to perform an automation command to a particular machine.

At block 176, the audio device 40 may determine if the detected audio data received at block 172 is different from the expected noise profile based on the comparison between the detected audio data and the expected noise profile at block 174. The audio device 40 may use a threshold to determine if the detected audio data and the expected noise profile are different enough to correlate to a machinery issue. For example, if the detected audio data deviates from the expected noise profile, to the point where the deviation exceeds a threshold, the audio device 40 may determine that the detected audio data is different from the expected noise profile.

If the audio device 40 determines the detected audio data is not different from the expected noise profile, the audio device 40, at block 172, may receive additional detected audio data to continue to monitor operation of the machine 60. The detected audio data not substantially deviating from the expected noise profile may indicate that the machine 60 is operating as expected, or that the machine 60 is not emitting abnormal or unexpected noises, beyond a tolerable threshold.

However, if the audio device 40 determines that the detected audio data is different from the expected noise profile, the audio device 40, at block 178, may determine that a machinery issue is present based on the detected audio data received at block 172. The detected audio data may deviate from the expected noise profile in such a way to suggest or correlate to a machinery issue of the machine 60. In addition, in some embodiments, the audio device 40 also analyzes secondary input (e.g., data associated with a voltage or current spike event, power output or generation data, data associated with a power surge event) when the noise profile deviation occurs. In this way, the audio device 40 may diagnose machinery issues (e.g., identify a probable cause) of the machine 60 based on the detected audio data and/or the secondary input. In some embodiments, an amount of derivation or a matching of the detected audio data to the expected noise profile may indicate a type of defect, and in some embodiments an amount of derivation between a determined directionality and the expected directionality indicate a type of defect or help to diagnose the type of defect. For example, if the amount of deviation of the detected audio data from the expected noise profile exceeds a threshold, the audio device 40 may determine a certain defect, however, if the amount of deviation exceeds a second threshold, the audio device 40 may determine a different defect.

In addition, the audio device 40 may utilize ranges in diagnosing defects. For example, a deviation in a first range may indicate a first defect while a deviation in a second range may indicate a second defect. Furthermore, in some embodiments, these thresholds or ranges may be used to determine severity of defect as well, for example, a first amount of deviation indicates a defect, and a second amount of deviation indicates a more severe version of the defect. Thus, the audio device 40 may analyze the detected audio data along with secondary data (e.g., secondary inputs) acquired via various sensors 31 or data sources to determine a probable cause to explain the deviation from the expected noise profile (e.g., identify what is malfunctioning with the machine 60). Similar to how the audio device 40 at block 146 of FIG. 5 determines the automation command based at least in part on the detected audio data, the audio device 40, at block 178, may reference noise profiles or audio datasets stored in the library to match the detected audio data to an expected machinery issue. For example, the machine 60 operating with a faulty gearbox may generate a first noise profile, the machine 60 operating with a disconnected wired connection may generate a second noise profile, and the machine 60 operating as expected may generate the expected noise profile, thus the audio device 40 may determine machinery issues (e.g., faulty gearbox, disconnected wired connection) based at least in part on comparing the detected audio data to these noise profiles or corresponding audio datasets stored in the library.

In some embodiments, the expected noise profile for an industrial environment may be associated with a directionality of the ambient noise. That is, the expected noise profile may include a collection of sound waveforms associated with an array of microphones 42, as depicted in FIG. 2. In addition, the expected noise profile may include a collection of sound waveforms associated with different audio devices 40 in the industrial environment. In any case, as the directionality of the noise changes, the audio device may detect that the audio data is different from the expected noise profile. In some embodiments, the change in the directionality may assist the audio device 40 to diagnose a problem or a source of a problem in the industrial environment.

After the audio device 40 detects the machinery issue, the audio device 40 may automatically perform a control operation based on the machinery issue, or recommend that a control operation be performed to an operator or administrator of the machine 60, the industrial control system 11, the industrial automation system 10, and the like. For example, if a particular machinery issue causes a tank to overfill, the audio device 40 may automatically perform, or automatically prompt (e.g., via a notification on the HMI 66) an operator or administrator to perform, a corrective action to prevent the tank overfilling from occurring.

The audio device 40 may also distinguish between human and objects in the industrial automation system 10 and may implement various controls and/or cause notification actions based on if a person 38 is present within the industrial automation system 10. For example, the audio device 40 may control how lights and/or air conditioning within the industrial automation system 10 operate based at least in part on whether a person 38 is within the space of the industrial automation system 10.

Keeping this in mind, FIG. 8 is a flowchart of a method 190 for controlling one or more devices within the industrial automation system 10 based on whether a person 38 or an object (e.g., non-human) are present as detected by the audio device 40. Although the method 190 is described below as performed by the audio device 40, it should be noted that the method 190 may be performed by any suitable processor to perform automation commands based on detected audio data. Moreover, although the following description of the method 190 is described in a particular order, it should be noted that the method 190 may be performed in any suitable order.

Referring now to FIG. 8, at block 192, the audio device 40 may receive detected audio data associated with an element of the industrial control system 11. The audio device 40 may receive the detected audio data in a similar manner as described above in FIG. 6 at block 142 or in FIG. 7 at block 172. In addition, the audio device 40 may receive orientation data indicating directionality of the detected audio data in a similar manner as described above in FIG. 6 at block 144.

At block 194, the audio device 40 may determine whether the detected audio data includes human audio embedded within the noise profile (e.g., signal characteristics defining the detected audio data) of the detected audio data. In certain embodiments, the audio device 40 may compare the detected audio data with templates or known data point arrangements of human audio, or may compare the audio data to expected noise profiles of humans. If the determined orientations or the noise profile of the detected audio data correspond to the known arrangements, orientations, or the expected noise profiles (e.g., emitted sounds, decibel ranges, speech patterns) of humans, the audio device 40 may determine that the element is a person 38. Otherwise, the audio device 40 may classify the element as an object, or non-human.

After the audio device 40 determines that the element is either a human (e.g., a person 38) or an object, at block 196, the audio device 40 may implement a control action and/or a notification action based on whether the element is determined to be the person 38 or an object. The control action may include operating a device in the industrial automation system 10 or controlling various environmental parameters in the industrial automation system 10. For instance, the audio device 40 may transmit a command to a machine control system 61 to change operation of a heating, ventilation, and air conditioning (HVAC) system in response to the person 38 not being located within the industrial automation system 10. As another example, in the event that the audio device 40 determines a person 38 is located within a machine 60 based on the particular audio data and determined orientation, the audio device 40 may implement a control action and/or a notification action associated with operating the machine 60 in a safe-state or otherwise changing operation of the machine 60 to protect the person 38.

With the foregoing in mind, in some embodiments, the audio device 40 may monitor for distress situations by listening for emergency stop commands and/or abnormal human sounds. In response to detecting the emergency stop command and/or the abnormal human sounds, the audio device 40 may analyze operation of various machines 60 to determine if abnormal operating conditions exist (e.g., machine 60 indicating an electrical fault or above-average load condition), may communicate with other audio devices 40 to determine the source location of the audio data, and/or may determine if various signals from a wearable device (e.g., health or vitals monitoring bracelet, helmet) of the person 38 indicate a distress state (e.g., accelerated heart rate, accelerated breathing rate, emotion of person 38 as indicated by speech characteristics such as speed of speech or a comparison of the speech characteristics to typical tones, cadences, or volumes of operators using the audio device, quick and/or abnormal motions from motion detectors on body). In response to these secondary inputs, the audio device 40 may determine the automation command to perform in response to the emergency stop command, such as which machine 60 to adjust operation of and what adjustment to perform to correctly address the emergency stop command (e.g., slow down or power-off the machine 60). In addition, the audio device 40 may use secondary inputs from other devices such as pressure pads, light curtains, or the lack of input from devices like the pressure pads and/or light curtains to detect if a person 38 is located as expected in the industrial automation system 10. By combining these various inputs methods, for example, checking for multiple secondary inputs, the audio device 40 may improve operation of the industrial automation system 10 and/or may increase safety of persons 38 operating the industrial automation system 10.

In addition, while following the method 140, the method 170, or the method 190, the audio device 40 may compare the detected audio data to the automation commands stored in the library. From the comparison, the audio device 40 may select an automation command that matches characteristics (e.g., frequency, amplitude, intensity) of the detected audio data. To determine the possible automation command from the selected automation commands, the audio device 40 may use one or more additional inputs, such as the orientation data, or the secondary input, to select or narrow down the possible automation command to the most likely automation command to have been provided based on the various characteristics and/or context provided from the additional input.

In some embodiments, the audio device 40 may have access to maintenance records and/or data logs associated with the industrial automation system 10, the respective machine 60, or the like via the communication network 54 or direct communication. These records may be stored in the database 94, on the audio device 40, the respective machine 60, or the like and may enable the audio device 40 to answer queries related to maintenance records and/or history of the machine 60. For example, questions directed to the audio device 40 may include when the last time a particular machine 60 was serviced, when the last date of refilling of a vessel was, and the like. Thus, through verbal commands spoken to the audio device 40, operators may access these maintenance records, data logs, historic records, or any suitable data stored in memory 50 or accessible by the communication network 54. After detecting the request for information, the audio device 40 may determine a directionality of the request, as described above, and query the respective machine 60, the memory 50, some database, or the like for the requested information based on the machine 60 or component that the verbal request is directed towards.

In some embodiments, the audio device 40 indicates its listening to the verbal command while detecting the audio data. While the audio device 40 detects the audio data, the audio device 40 may indicate that it is listening to the automation command. The audio device 40 may communicate the reception of the audio data by changing a color of light emitted by an indicator (e.g., a light-emitting diode indicator), by emitting an audible indicator (e.g., an audible "beep" or other suitable sound), by changing a solid light to a flashing light emitted by the indicator, by using haptic feedback such as if the audio device 40 is included in a wearable device (e.g., watch, helmet, button), or any combination thereof. Furthermore, the audio device 40 may communicate a variety of statuses through changing a variety of lights and/or emitting a variety of audible sounds. For example, in addition to communicating the reception of audio data, the audio device 40 may communicate reception of an abnormal noise, local processing of the detected audio data, central processing of the detected audio data, a processing error, an error in the reception of audio data, such as from the surrounding environment being too noisy to successfully interpret the command, and the like.

In some embodiments, the audio device 40 may use voice signature processing to identify, authenticate, and/or authorize a person 38 before processing the audio data corresponding to the verbal command. By analyzing amplitude of the voice of the person 38, speed of speaking, and/or a frequency of the voice, the audio device 40 may be able to determine if the person 38 is authorized to use the audio device 40 to operate one or more machines 60 of the industrial automation system 10. In addition, some audio devices 40 may permit different levels of authorization, where a first subset of persons 38 may validly command a first subset of automation commands, while a second subset of the persons 38 may validly command a second subset of automation commands. For example, any person 38 may have authorization to verbally command an emergency stop but just certain persons 38 may have authorization to increase production rates for a particular portion of the industrial automation system 10.

As described above, the audio device 40 may be able to have natural language conversation with operators and/or administrators, such as the person 38. For example, the person 38 may ask the audio device 40 a question and the audio device 40 may be able to interpret the question, determine the answer to the question based on the context of the conversation or the environment (e.g., facilitated by secondary inputs to the audio devices 40), and communication the answer to the question back to the person 38 via emission of audio data via the audio output 122. This natural language feature may be managed by natural language software or function that relies on communication algorithms either stored locally on the audio device 40 or stored in a memory 50 location accessible by the audio device 40. For example, the natural language software or function may be operated by computing devices associated with the server 92 and partially stored in the database 94. In addition, the audio device 40 may converse with the person 38 by emitting audio data corresponding to the answer through an audio output, such as a speaker of the audio device 40, so that the person 38 may hear the answer. It should be understood that any suitable means or technique of verbal communication may be used by or interpreted by the audio device including languages such as English, German, Spanish, French, Chinese, or the like.

In some embodiments, the industrial automation system 10 may include a range sensor system to detect positions and movement. In some embodiments, the detected image data may be used by the audio device 40 to determine confidence levels for detected audible commands, as described above in block 148 of the method 140. By way of example, the range sensor system of the audio device 40 may include digital cameras, video cameras, infrared sensors, optical sensors (e.g., video/camera), radio frequency energy detectors, sound sensors, sonar sensors, vibration sensors, magnetic sensors, and the like to detect the positions and/or movements of any element in its viewing window. The positions and/or movements may be similarly compared to stored expected positions and/or movements, and used to control various components of the industrial automation system 10 in addition to detected audio data. In this way, a device or object a person 38 hold or gestures with may also be detected, and the positions and/or movements of the object held by the person 38 may be used to determine an orientation of the person 38 and/or a target machine 60 of the verbal command. The detected direction and/or commands may be used to determine a confidence value for the detected audible command. Example implementations of determining an automation command based on detected positions or movements of a person and corresponding confidence levels are described in more detail in U.S. Pat. No. 9,498,885 filed on Nov. 22, 2016, the contents of which are hereby incorporated by reference in their entirety for all purposes.

With the foregoing in mind, the audio device 40 may be used to program or configure more than one machine 60. In a similar manner, more than one audio devices 40 may also be configured at the same time with one automation command. For example, an operator may command all ten lights (e.g., stacklights 69) to operate to emit green light (e.g., such as a strobing green light). These ten lights may respond with a blinking light to communicate to the operator (e.g., verify) that the command was received. The automation command may be used by the audio device 40 to cause control signals to be transmitted to each of the ten lights for a substantially simultaneous or a sequential light operation adjustment (e.g., to change an operation of one or more lights at a time). Some embodiments may use a second verification action to communicate to the operator that the command was received and enacted.

Technical effects of the present disclosure include techniques for operating an industrial automation system through verbal commands and additional inputs. An audio device designed for industrial applications may detect audio data. Based upon the detected audio data, the audio device may determine one or more possible automation commands. In some embodiments, the audio device implements an automation command to adjust operation of a component of the industrial automation system, to power-down or power-on a component of the industrial automation system, to answer a question received as a verbal command, and the like. In this way, the audio device may facilitate handless or remote operation of various devices of the industrial automation system by an operator within line of sight of the various devices, thereby increasing safety and improving methods of managing industrial automation systems.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A method for performing industrial automation control in an industrial automation system, comprising:
    detecting, via an audio device, audio data by a user in the industrial automation system;
    determining, via the audio device, orientation data configured to indicate a directionality of the user based at least in part on a strength of the audio data;
    determining, via the audio device, an automation command that corresponds to a first control action configured to control one or more operations of a machine in the industrial automation system based on the audio data and the orientation data; and
    implementing, via the audio device, the first control action for the machine based at least in part on the automation command.

2. The method of claim 1, comprising determining, via the audio device, the orientation data based at least in part on the strength of the audio data relative to additional strength of additional audio data.

3. The method of claim 2, comprising determining the machine associated with the automation command based on a relationship between the audio data and the orientation data.

4. The method of claim 1, comprising:
    receiving, via the audio device, a secondary input configured to verify the automation command; and
    determining, via the audio device, a confidence value for the automation command based on the audio data and the secondary input.

5. The method of claim 1, comprising:
    determining, via the audio device, a source location of the audio data; and
    determining, via the audio device, the machine associated with the automation command based on the source location.

6. The method of claim 1, wherein the automation command is determined based on at least one characteristic associated with the audio data, wherein the at least one characteristic comprises frequency of the audio data, of the audio data, volume of the audio data, intensity of the audio data, or any combination thereof.

7. The method of claim 1, comprising:
    determining, via the audio device, a confidence value of the automation command based on the orientation data; and
    implementing, via the audio device, the first control action based at least in part on the confidence value.

8. The method of claim 1, comprising determining the automation command configured based on a plurality of automation commands stored in a database and a plurality of audio datasets associated with the plurality of automation commands stored in the database, wherein determining the automation command comprises matching the audio data to one of the plurality of audio datasets based on a first set of characteristics in common between the audio data and the one of the plurality of audio datasets.

9. A system for performing industrial automation control, comprising:
    an audio device, configured to:
        receive audio data of an element in an industrial automation system;
        determine orientation data configured to indicate a directionality of the element based on a strength of the audio data;
        determine an automation command that corresponds to a first control action configured to control one or more operations of a machine in the industrial automation system based on the audio data, the orientation data, a plurality of automation commands stored in a database, and a plurality of audio datasets associated with the plurality of automation commands stored in the database; and
        send the first control action to the machine based at least in part on the automation command, wherein the first control action is configured to cause the machine to adjust a respective operation of the one or more operations.

10. The system of claim 9, wherein the element is a user in the industrial automation system, and wherein the audio data comprises an audible command configured to instruct the machine to perform the respective operation.

11. The system of claim 10, wherein the audible command comprises at least two recitations of a word or phrase.

12. The system of claim 9, wherein the element comprises the machine in the industrial automation system, and wherein the audio data corresponds to an expected noise profile for the machine.

13. The system of claim 12, wherein the audio device is configured to:
    determine a deviation of the audio data from the expected noise profile associated with the machine; and
    determine whether the machine has a defect based on the deviation.

14. The system of claim 9, comprising an additional audio device, wherein the audio device is configured to determine a source location of the audio data based at least in part on the audio data and an additional audio data detected by the additional audio device.

15. The system of claim 14, wherein the audio device is configured to determine the first control action based on a relationship between the audio data and secondary input data configured to confirm the first control action.

16. The system of claim 9, wherein the audio device comprises a plurality of microphones and a processor, and wherein the processor is configured to:
receive detected audio strength data from each of the plurality of microphones, wherein the detected audio strength data comprises the strength of the audio data;
determine the orientation data at least in part by comparing the strength of the audio data from a first microphone of the plurality of microphones to an additional strength of the audio data detected by a second microphone of the plurality of microphones; and
determine the automation command based on the audio data, the detected audio strength data, the directionality of the element, the plurality of automation commands stored in the database, and the plurality of audio datasets associated with the plurality of automation commands stored in the database.

17. A tangible, non-transitory computer-readable medium configured to store instructions executable by a processor of an electronic device that, when executed by the processor, cause the processor to:
detect audio data associated with a first machine or user in an industrial automation system;
determine orientation data configured to indicate a directionality of the first machine or of the user based on the audio data;
determine an automation command that corresponds to a first control action configured to control one or more operations of a second machine in the industrial automation system based on the audio data and the orientation data; and
send the first control action to the second machine based at least in part on the automation command, wherein the first control action is configured to cause the second machine to adjust a respective operation of the one or more operations.

18. The non-transitory computer-readable medium of claim 17, wherein the instructions, when executed by the processor, cause the processor to:
receive a first secondary input data from a sensor system associated with a presence of the user in the industrial automation system; and
determine the first control action to correspond to an instruction to operate the second machine into a powered-down state in response to the first secondary input data not matching expected secondary input data associated with the audio data.

19. The non-transitory computer-readable medium of claim 17, comprising instructions, when executed by the processor, cause the processor to:
receive an additional audio data from an additional audio device;
determine a source location of the audio data based on one or more triangulation schemes and the additional audio data; and
determine the automation command based on the source location.

20. The non-transitory computer-readable medium of claim 17, comprising instructions, when executed by the processor, cause the processor to:
receive an expected noise profile corresponding to an expected operation of the first machine;
determine a deviation of the audio data from the expected noise profile; and
determine the automation command based on the deviation.

* * * * *